Sept. 18, 1945.  M. H. GRAHAM  2,385,132

PROCESS AND APPARATUS FOR MAKING INFUSIONS

Filed Feb. 7, 1941  9 Sheets-Sheet 1

INVENTOR
Maurice H. Graham
BY Oscar W. Giese
ATTORNEY

Sept. 18, 1945.   M. H. GRAHAM   2,385,132
PROCESS AND APPARATUS FOR MAKING INFUSIONS
Filed Feb. 7, 1941   9 Sheets-Sheet 2
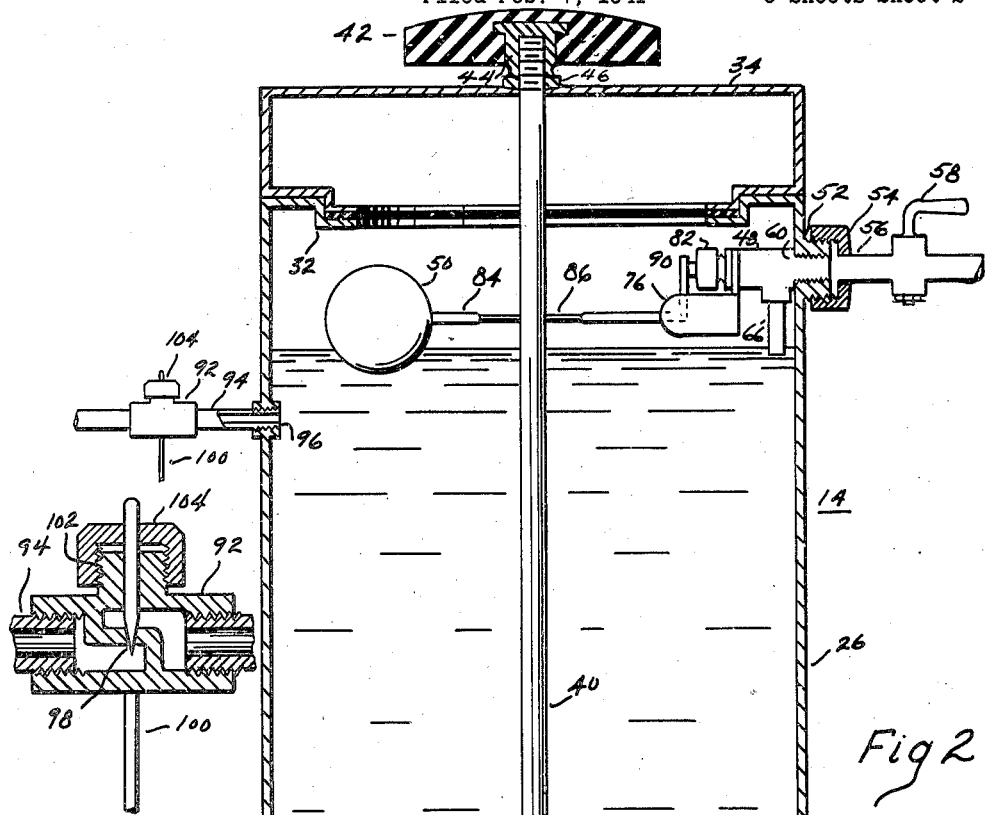
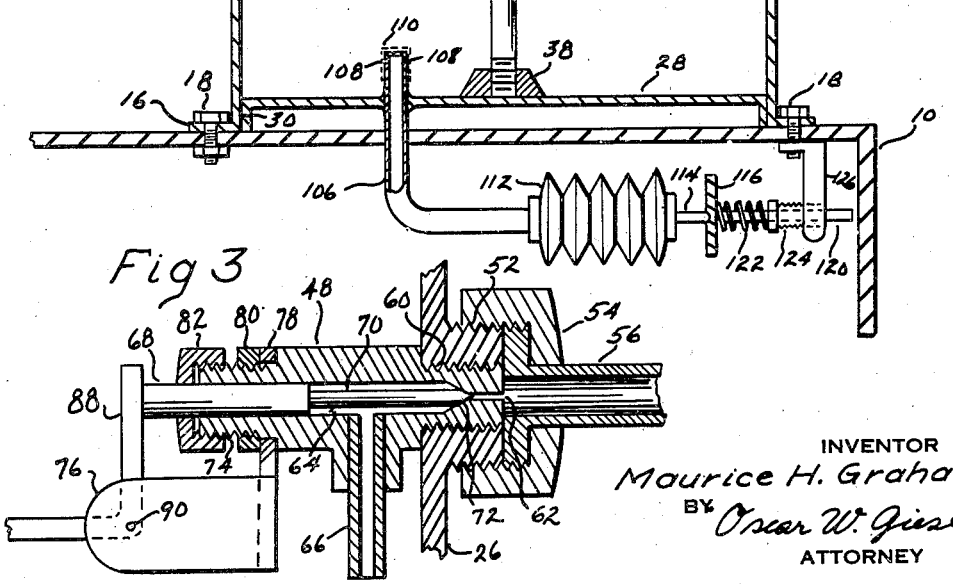
INVENTOR
Maurice H. Graham
BY Oscar W. Giese
ATTORNEY

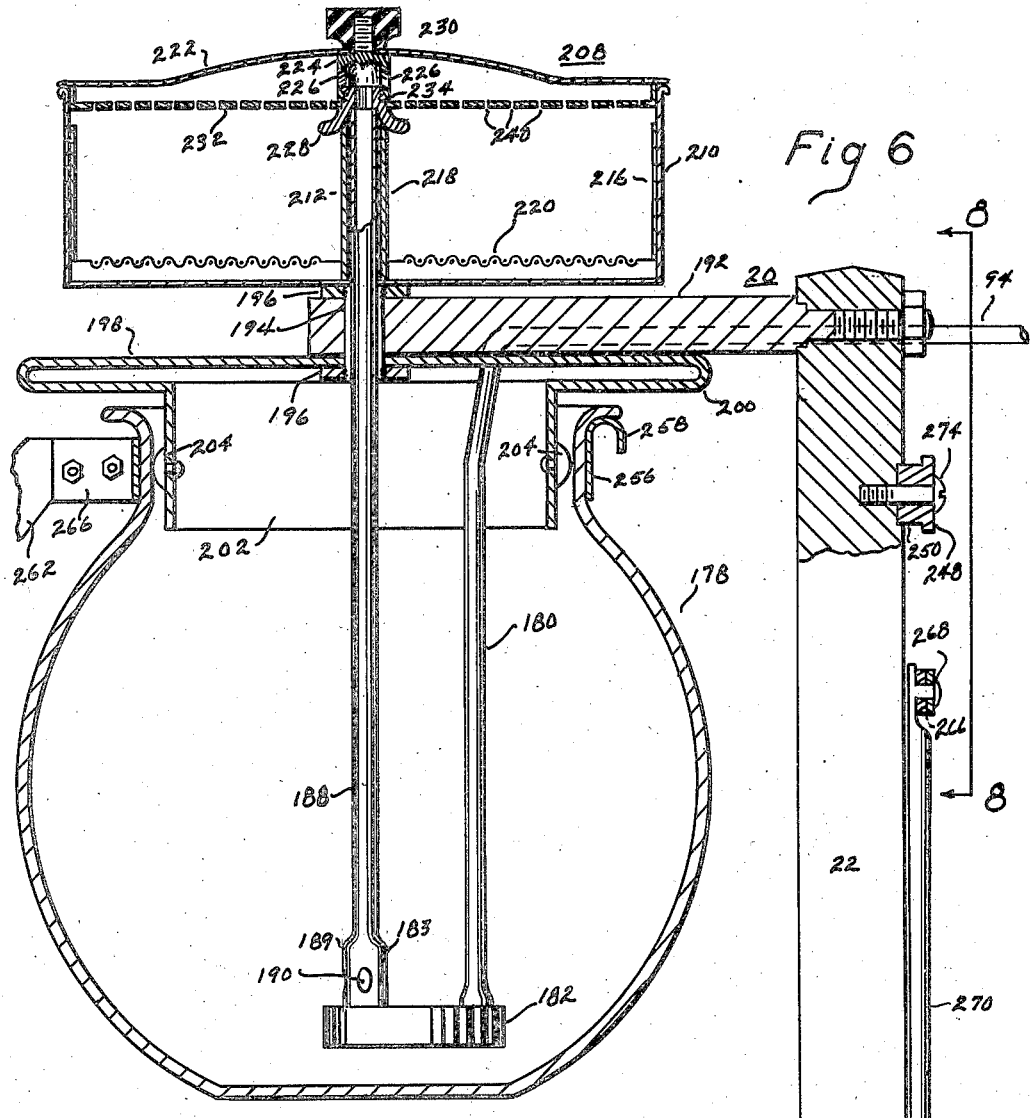

Sept. 18, 1945.  M. H. GRAHAM  2,385,132
PROCESS AND APPARATUS FOR MAKING INFUSIONS
Filed Feb. 7, 1941  9 Sheets-Sheet 5
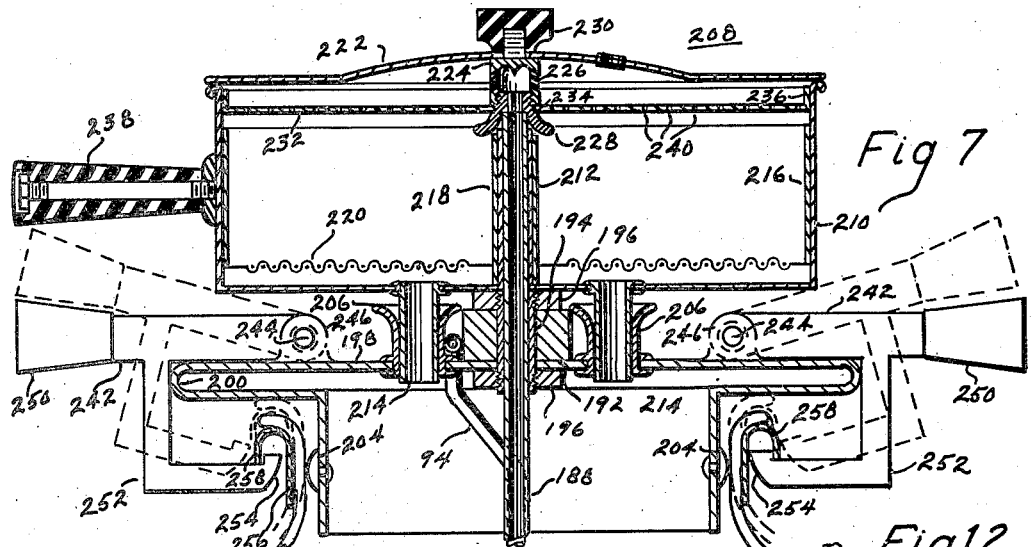
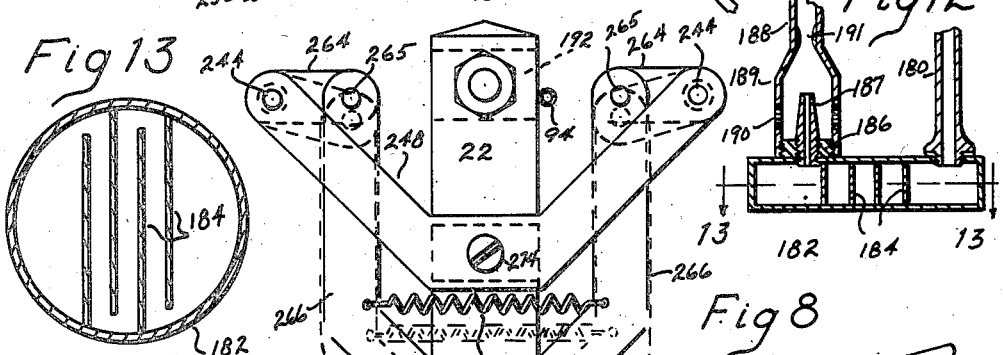
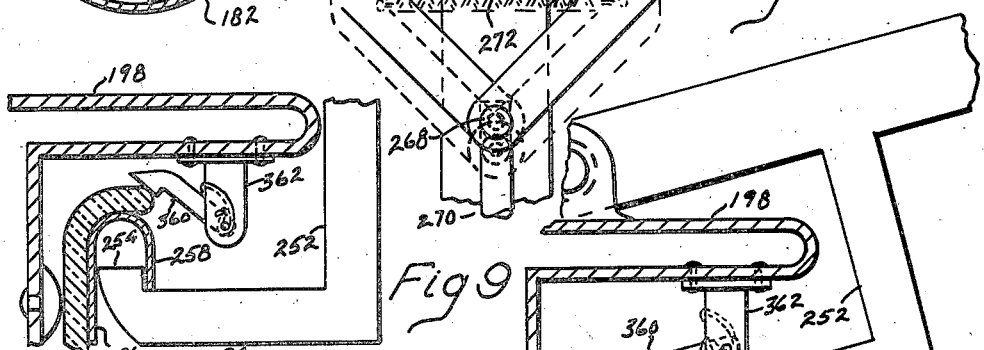
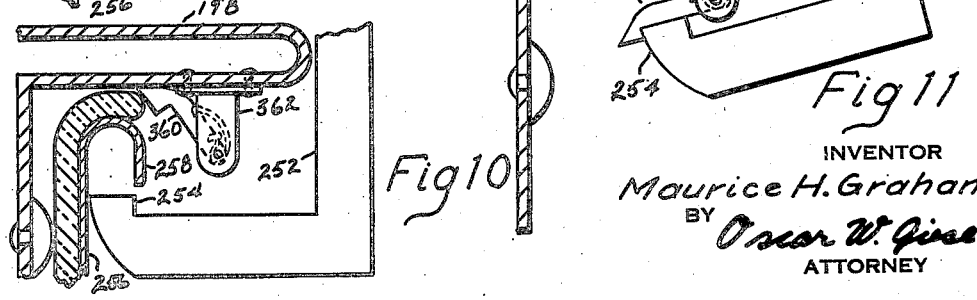
INVENTOR
Maurice H. Graham
BY Oscar W. Gise
ATTORNEY Sept. 18, 1945.  M. H. GRAHAM  2,385,132
PROCESS AND APPARATUS FOR MAKING INFUSIONS
Filed Feb. 7, 1941  9 Sheets-Sheet 6
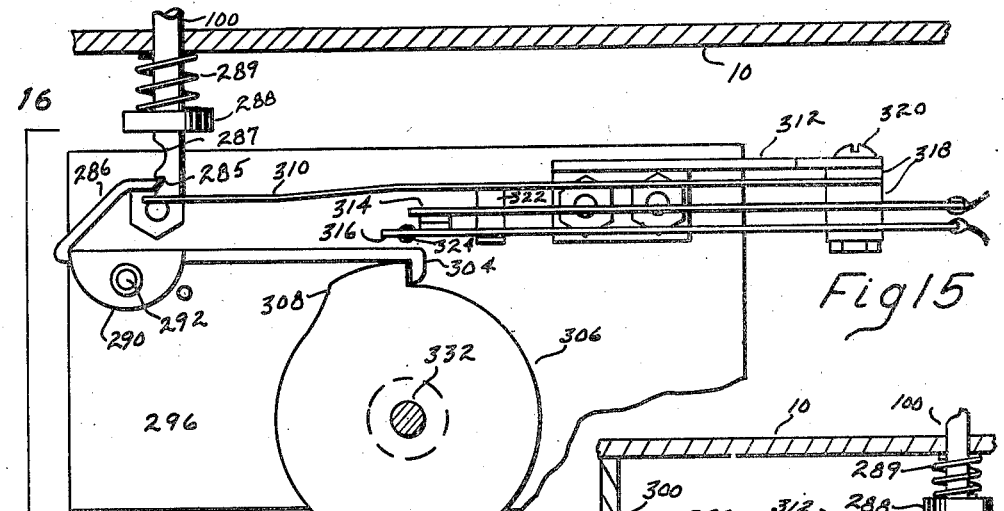
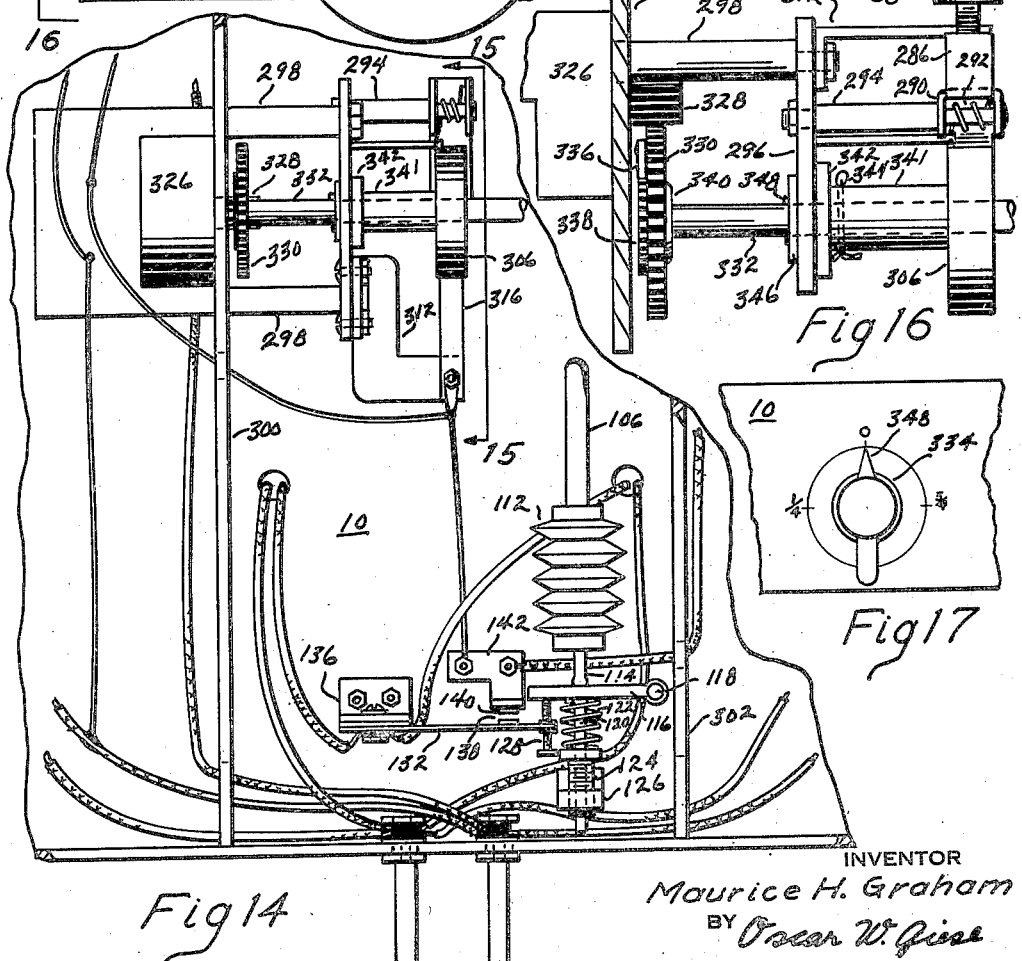
INVENTOR
Maurice H. Graham
BY Oscar W. Giese
ATTORNEY Sept. 18, 1945.    M. H. GRAHAM    2,385,132
PROCESS AND APPARATUS FOR MAKING INFUSIONS
Filed Feb. 7, 1941    9 Sheets-Sheet 7

INVENTOR
Maurice H. Graham
BY Oscar W. Giese
ATTORNEY

Sept. 18, 1945.　　　　M. H. GRAHAM　　　　2,385,132
PROCESS AND APPARATUS FOR MAKING INFUSIONS
Filed Feb. 7, 1941　　　9 Sheets-Sheet 8
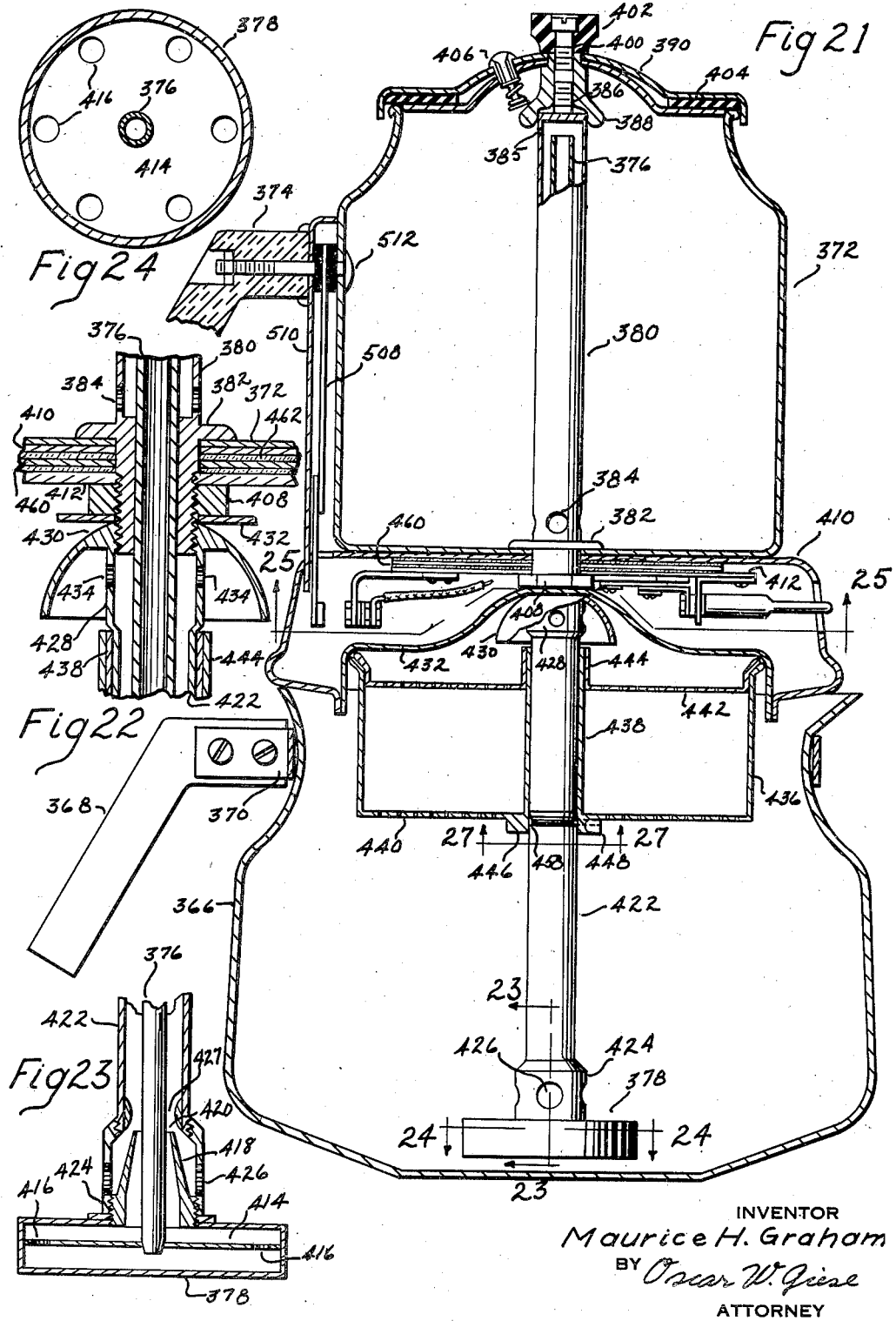
INVENTOR
Maurice H. Graham
BY Oscar W. Giese
ATTORNEY Sept. 18, 1945.   M. H. GRAHAM   2,385,132
PROCESS AND APPARATUS FOR MAKING INFUSIONS
Filed Feb. 7, 1941   9 Sheets-Sheet 9
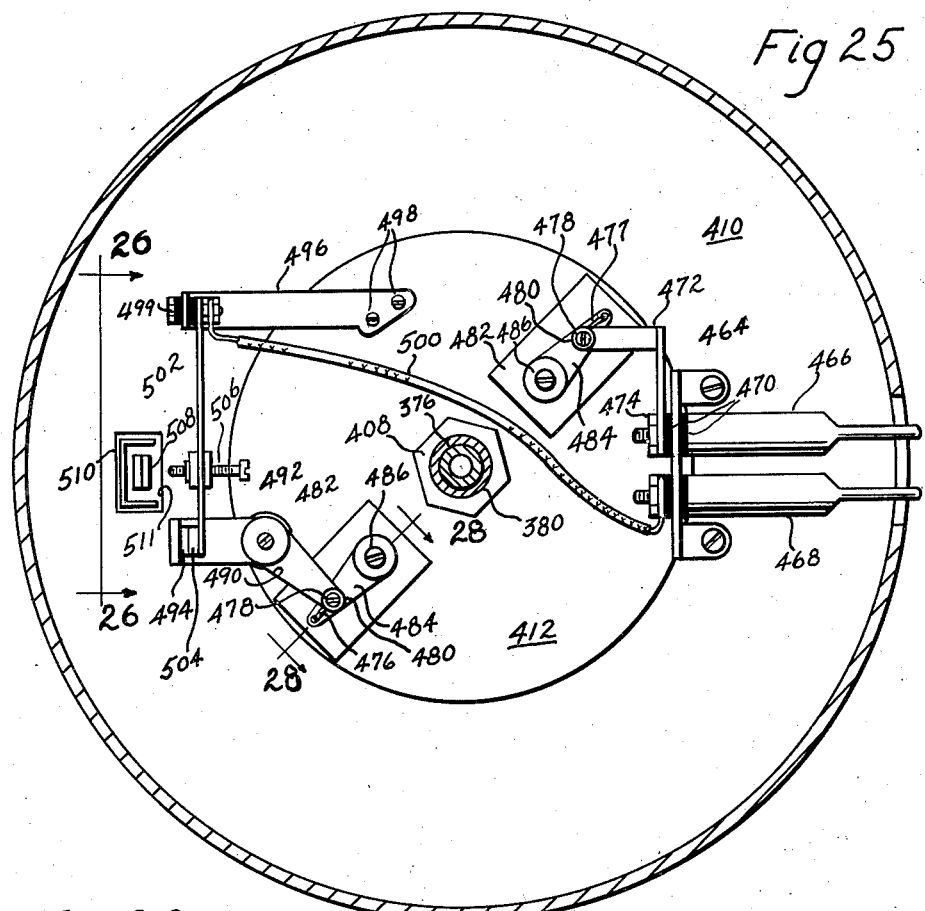
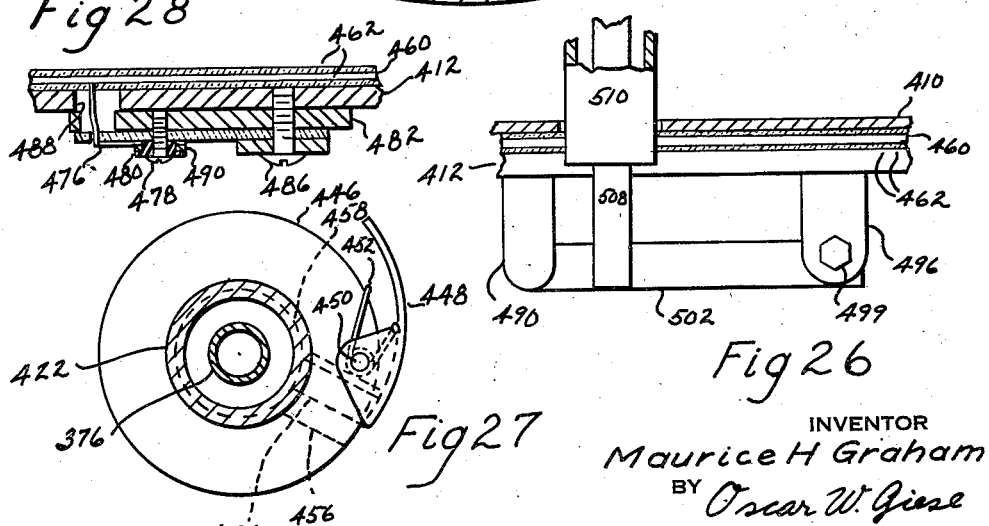
INVENTOR
Maurice H Graham
BY Oscar W. Giese
ATTORNEY Patented Sept. 18, 1945

2,385,132

UNITED STATES PATENT OFFICE 2,385,132

PROCESS AND APPARATUS FOR MAKING INFUSIONS

Maurice H. Graham, St. Louis Park, Minn.

Application February 7, 1941, Serial No. 377,895

17 Claims. (Cl. 99—71)

The present invention relates to the making of coffee infusions and has for a broad object an increase in efficiency and economy in making the infusions.

Another broad object of the invention is to utilize superheated water for extracting coffee in a coffee maker without the application of other heat to the coffee maker itself so that the infusion liquid will be kept at or near boiling during the extraction in spite of heat radiation losses common to all coffee makers.

A further object of the invention is to provide a batch process for making coffee infusions in which superheated water furnishes the water supply for each batch and also furnishes the power means for recirculating the infusion liquid as the process continues.

It is a further object of the invention to provide an apparatus for efficiently carrying out the foregoing process of making coffee infusions without locally overheating them and thereby giving them undesirable flavors.

Another object is to provide an apparatus in which the infusion pot is readily separable from the remainder of the infusion mechanism.

It is a still further object to provide means for automatically terminating a coffee making operation in which superheated water is the medium used for the extraction.

Additional objects such as the provision of devices to insure safe operation and signal means to indicate the completion of a batch, together with many more objects of the invention, will be understood from the context of the specification and the appended drawings and claims.

Referring more particularly to the drawings

Figure 1 constitutes a plan view of the entire device with the container for holding the coffee grounds removed therefrom;

Figure 2 is an enlarged vertical section of the water heater indicated by the line 2—2 of Figure 1;

Figure 3 is a detailed view of the float valve mechanism shown in Figure 2;

Figure 3 is a detailed view of the float valve mechanism shown in Figure 2;

Figure 4 is a detailed view of the superheated water supply valve shown in Figure 2;

Figure 6 is an enlarged vertical section of the infusion pot and coffee container taken on the line 6—6 of Figure 1;

Figure 7 is a vertical section of the coffee container and the holding mechanism for maintaining the infusion pot in operative position, taken on the line 7—7 of Figure 1 and with the coffee container in position;

Figure 8 is a rear view of the connecting links operated by the holding mechanism, as indicated by the line 8—8 of Figure 6;

Figure 9 is a modified detailed view of one of the arms of the infusion pot holder shown in Figure 7 illustrating the position of the parts when the infusion pot is in position and the process is in operation;

Figure 10 is a view similar to Figure 9 showing the position of the parts when the infusion pot is held in an upper position prior to displacement of the holder arm;

Figure 11 is a view similar to Figure 9 in which the infusion pot is removed and the holder arm is automatically latched in an open position;

Figure 12 is a vertical section in detail of the condenser and recirculator shown in full lines in Figure 6;

Figure 13 is a cross-sectional view of the condenser taken on the line 13—13 of Figure 12;

Figure 14 is a bottom view of the apparatus showing the electric timer mechanism and the cut-out for the water heating circuits;

Figure 15 is a side view of the timing arm and associated mechanism as viewed in the direction of the arrows 15—15 in Figure 14, the parts being in the position assumed at the beginning of a coffee making operation;

Figure 16 is an end view of the timing apparatus taken in the direction of the arrows as shown in Figure 15;

Figure 17 is an elevational view of the means for indicating the condition of the timing mechanism;

Figure 21 is a modification of the device showing a particular application of the invention to a domestic coffee making apparatus;

Figure 22 is a detailed vertical section in part of the circulating tubes shown in Figure 21;

Figure 23 is a detailed vertical section of the condenser and circulating mechanism taken on the line 23—23 of Figure 21;

Figure 24 is a cross-sectional view of the condenser taken on the line 24—24 of Figure 21;

Figure 25 is a bottom view of the heating element and thermostatic cut-out as viewed in the direction of the arrows 25—25 of Figure 21;

Figure 26 is a side view of the thermostatic cut-out as viewed in the directions of the arrows 26—26 of Figure 24;

Figure 27 is a bottom view of the device for retaining the container for coffee grounds in position on the recirculating tube as indicated by the arrows 27—27 of Figure 20; and Figure 28 is a section of the heating element through one of its connections as shown by the line 28—28 of Figure 25.

General description

Figure 1:
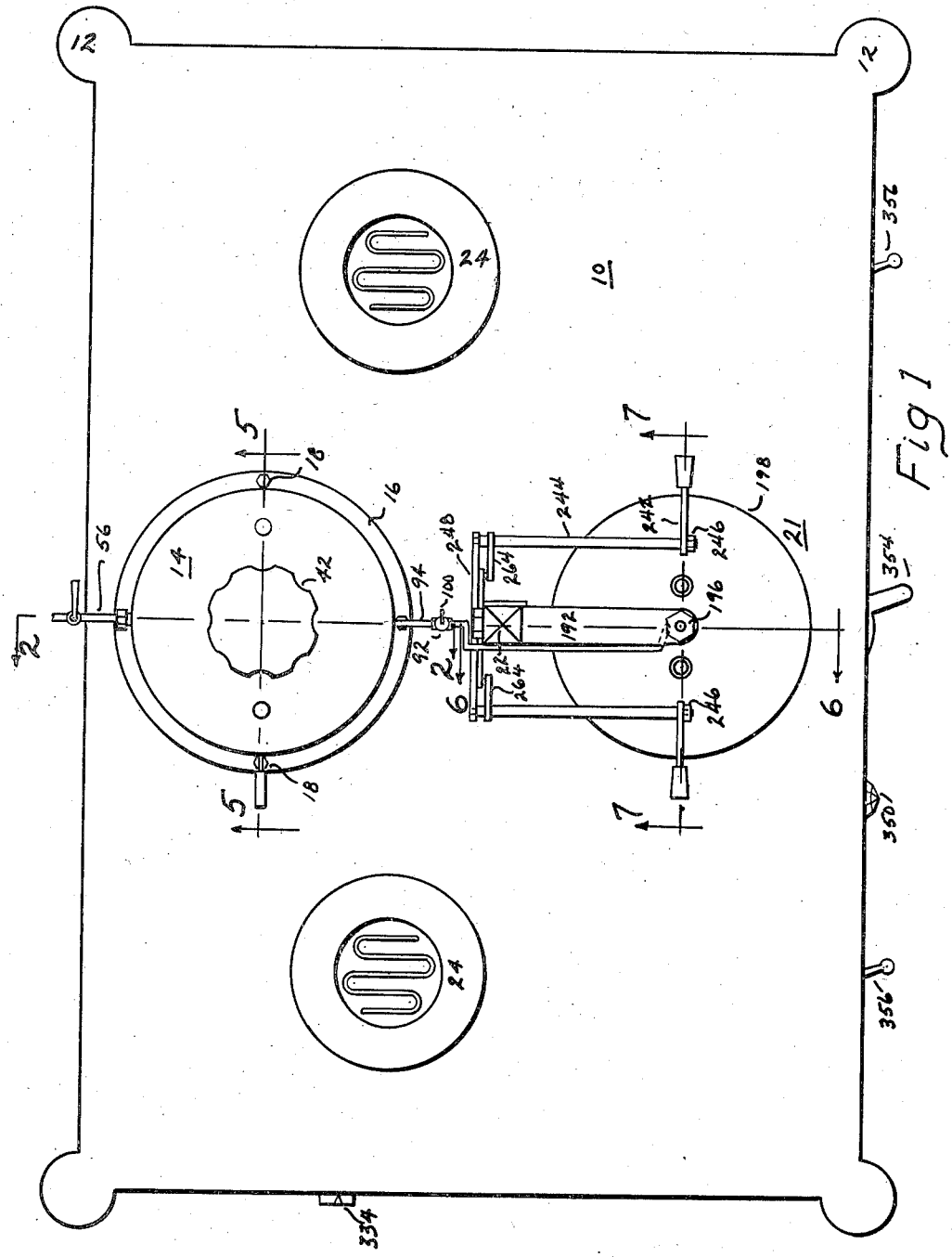

In general the invention consists of a process and apparatus which involves the utilization of superheated water as the source of heat in making coffee infusions. Preferably the superheated water is also used as the sole source of power for circulating the infusion liquid through the coffee and the superheated water also preferably constitutes the sole source of heat.

The principal embodiment of the invention which is disclosed herein is particularly intended for use in restaurants and other places where a large amount of coffee must be furnished over an extended period of time and is hereinafter referred to as the "commercial" type. A modified form of apparatus which is more especially designed to be used in the household is illustrated in Figures 21 to 28, and is hereinafter referred to as the "domestic" type.

In both types of apparatus there is a compartment for receiving the infusion liquid which passes down through the coffee holder which is located near the top of the compartment and there is a second compartment constituting a source of superheated water. In both instances the second compartment is normally closed to the atmosphere so as to maintain a suitable steam pressure above the water which is heated therein.

The superheated water is introduced into the lower portion of the infusion-receiving compartment and heats the liquid therein and, in the embodiments disclosed in this application, the superheated water passes into the infusion-receiving compartment through a tube which leads to a device adapted to efficiently transfer heat from the superheated water to the infusion liquid. This device is hereinafter referred to as a "condenser" although in some instances very little, if any, steam enters the condenser and its primary function is to transfer heat to the surrounding body of infusion liquid. According to both embodiments the water which is still heated at least substantially to its boiling point is conducted upwardly from the condenser to a point above the coffee in the coffee holder where it is discharged and is then permitted to flow downwardly through the coffee grounds into the infusion-receiving compartment.

Preferably the heated water discharges from the condenser through the jet of a jet pump, the latter being located in the lower portion of the infusion-receiving compartment. The infusion liquid is drawn in through apertures in the jet pump and is forced upwardly through a tube discharging above the coffee holder. The superheated water thus constitutes the motivating fluid for circulating the infusion liquid through the coffee which is being infused. It is to be noted that the infusion-receiving compartment communicates with the rest of the apparatus through its open top and constitutes a removable and portable container.

Referring now to the commercial type of coffee making apparatus, the water is superheated in a compartment generally designated 14 (Figure 1) and is conducted to the infusion-receiving compartment generally designated 21 through the pipe 94. A valve, generally designated at 92, is located in the pipe 94 between the water heating compartment 14 and the infusion-receiving compartment 21. The valve 92 regulates the amount of water passing into the compartment 21 and, although it might be manually operated, it is preferably controlled automatically to open at the beginning of the coffee making operation and to close at a predetermined time or upon the occurrence of some condition such as a change of temperature in the water heater or upon the filling of the infusion-receiving compartment. In the particular embodiment herein described, the valve 92 is closed at a predetermined time after the commencement of the coffee making operation. During this time a single batch of coffee grounds may be fully utilized in making a single batch of coffee and this is due largely to the fact that the water circulates at boiling temperature.

In the commercial type of apparatus the water heating compartment 14 is preferably connected with the city water supply line and a float operated valve mechanism insures that the supply of water in the compartment will remain at a substantially constant level.

The temperature of the water in compartment 14 is rather carefully controlled so as to maintain a fairly constant pressure in the vapor space above the water level and, since this pressure is a function of the temperature of the water, the latter may be conveniently controlled by means responsive to changes in the vapor pressure.

In the commercial form of apparatus the water passing through the pipe 94 is conducted downwardly, as shown in Figure 6, through a tube 100 and a condenser 102 located in the lower portion of the infusion-receiving compartment 178 and it then passes upwardly through a jet pump 103 and a tube 188 from whence it is discharged at a point above the coffee in the coffee holder. After flowing downwardly through the coffee the liquid, which is now referred to as the infusion, collects in the compartment 178.

For best results the infusion process is usually conducted for a period of about four minutes, the rate of flow and the size of the infusion compartment being such that the infusion compartment becomes substantially full at the end of that period.

The pressure generated in the water heater is such as to insure that the water which is conducted into the fusion compartment will have sufficient latent heat to account for heat losses and maintain the infusion liquid substantially at the boiling temperature during the process. The pressure may be considerably higher provided that it does not exceed the minimum line pressure in the water supply pipe, but in practice a pressure of about eight pounds per square inch above atmospheric pressure has been found to be satisfactory.

Figure 18:
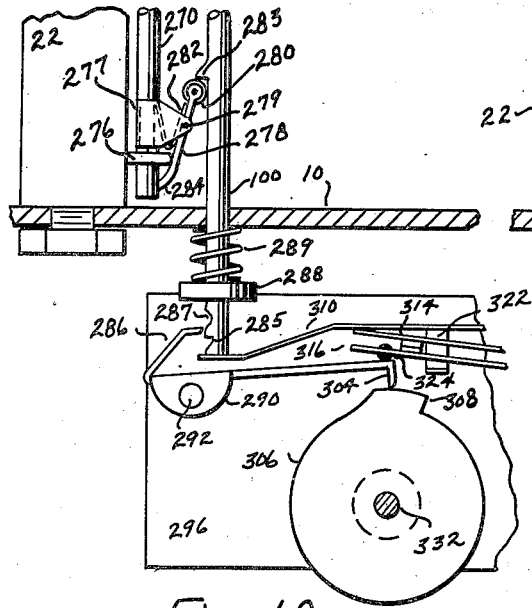
Figure 18 is a view of the timing mechanism similar to Figure 15 showing the position of the parts when the superheated water valve has been closed but the timer motor is still running.

As shown in Figure 1, the commercial type of apparatus may be mounted on a base 10 constructed of sheet steel or other suitable material, and the side portions of the base member may be bent over as shown in Figure 10 to enclose the control mechanism located underneath the base 10. At each of the four corners of the base 10, tubular legs 12 may be provided and these serve to reenforce the side portions and to provide additional support for the base member. The water heater generally indicated at 14 may be provided with a flange portion 16 and secured to the base 10 by means of bolts 18. A supporting member 20 for holding the infusion pot 21 and the coffee container is shown in more detail in Figures 6 and 7. The post 22 of the support 20 may be secured to the base 10 as shown in Figure 18.

At either side of the supporting member 20 and the water heater 14 is an electric standby heater 24 of the usual type for keeping an infusion pot with its contents warm after the extraction process has been completed.

Water heater

Referring now more particularly to the water heater 14 as shown in Figures 2, 3, 4 and 5, the heater is composed of cylindrical walls 26 which are flanged at the bottom, as previously indicated at 16. A bottom plate 28 is welded or otherwise secured to the inner portion of the cylindrical wall portion 26 to make a water-tight and pressure-resistant joint at 30. The upper portion of the cylindrical member 26 is formed into an annular flange 32 upon which is adapted to fit a cover member 34 and a rubber gasket 36 is placed between the cover and the flanged portion of the container to insure a tight connection when the cover 34 is secured in place.

For the purpose of securing the cover member 34 tightly in place, the bottom plate 28 is provided at its center with a lug 38 which is welded or otherwise secured to the upper surface of the bottom plate. The lug 38 is threaded to receive a rod 40 which is threaded at each end and which extends through an aperture provided in the center of the cover 34. A hand wheel 42 which be made of a moldable heat-resistant material is provided with a threaded hub 44 which may be screwed onto the upper end of the rod 40. Preferably the cover 34 is slightly countersunk at its center to receive a brass bushing 46 which prevents leakage about the rod 40 when the cover is fastened in place.

At the rear of the water heater a float valve 48 is disposed so as to communicate with an outside source of water under pressure such as from a city water main. The float 50 normally maintains a constant level of water in the water heater 14. A threaded portion 52 of the water heater 14 receives the packing nut 54 which in turn forms a union between the flanged pipe 56 and the threaded portion 52. The pipe 56 leads to the outside source of water mentioned above and bears a shut-off valve 58 for completely shutting off the water supply if it be desired to clean out the water heater for example. The threaded portion 52 is also tapped to communicate with the pipe 56 and to receive the threaded end 60 of the float valve. As shown in Figure 3, the threaded end 60 has a small passageway 62 centrally drilled to allow water to flow into the passageway 64 and thence through the stub pipe 66 and into the water heater proper. A valve needle 68 has a reduced portion 70 which is beveled at its end 72 to fit against the passageway 62 and thereby shut off the flow of water from the outside source. When the needle 68 is retracted, water will again flow into the water heater. At the end of the valve 48 opposite the connection with pipe 26 is another reduced threaded portion 74 through which the valve needle 68 can slide.

A U-shaped bracket member 76 has an extension 78 which is drilled to fit about the threaded portion 74 and a nut 80 is drawn up tightly to secure the extension 78 against the shoulder of the threaded portion 74. A packing nut 82 prevents water from leaking past the needle 68. A rod 84 is secured to the float 50 and is bent at 86 so as to circumvent the rod 40 in the center of the water heat. The end 88 of the rod 84 opposite the float 50 is bent upwardly at right angles and is pivotally secured at 90 between the ears of the bracket 76. The right angle portion 88 of the rod 84 is so disposed as to bear upon the needle 68 when the float is in a horizontal position and thus shut off the water supply. If the level of the water within the water heater is lowered the float and its rod 84 will relieve the pressure on the needle 68 and thus allow water to flow in and re-establish the normal level.

At the opposite side of the water heater 14 is another valve 92 which is placed in the outlet pipe 94 leading from the water heater. The end of the pipe 94 is threaded and is screwed into the top 96 of the wall 26 of the water heater. This hot water outlet may be quite close to the normal water level as shown in Figure 2 because the rate of outlet flow never exceeds that of the inlet flow and as a result the water level never varies much from the normal.

The valve 92 is preferably a needle valve of the S-type as shown in detail in Figure 4 and has a small tapered opening into which fits a correspondingly tapered needle point 98. The needle point 98 is at the end of a U-shaped valve rod 100, the other end of which extends down through the base 10 and will be later described in detail. The needle slides in the threaded portion 102 of the valve 92 which in turn bears the packing nut 104 to insure against leakage of the superheated water.

Figure 5:
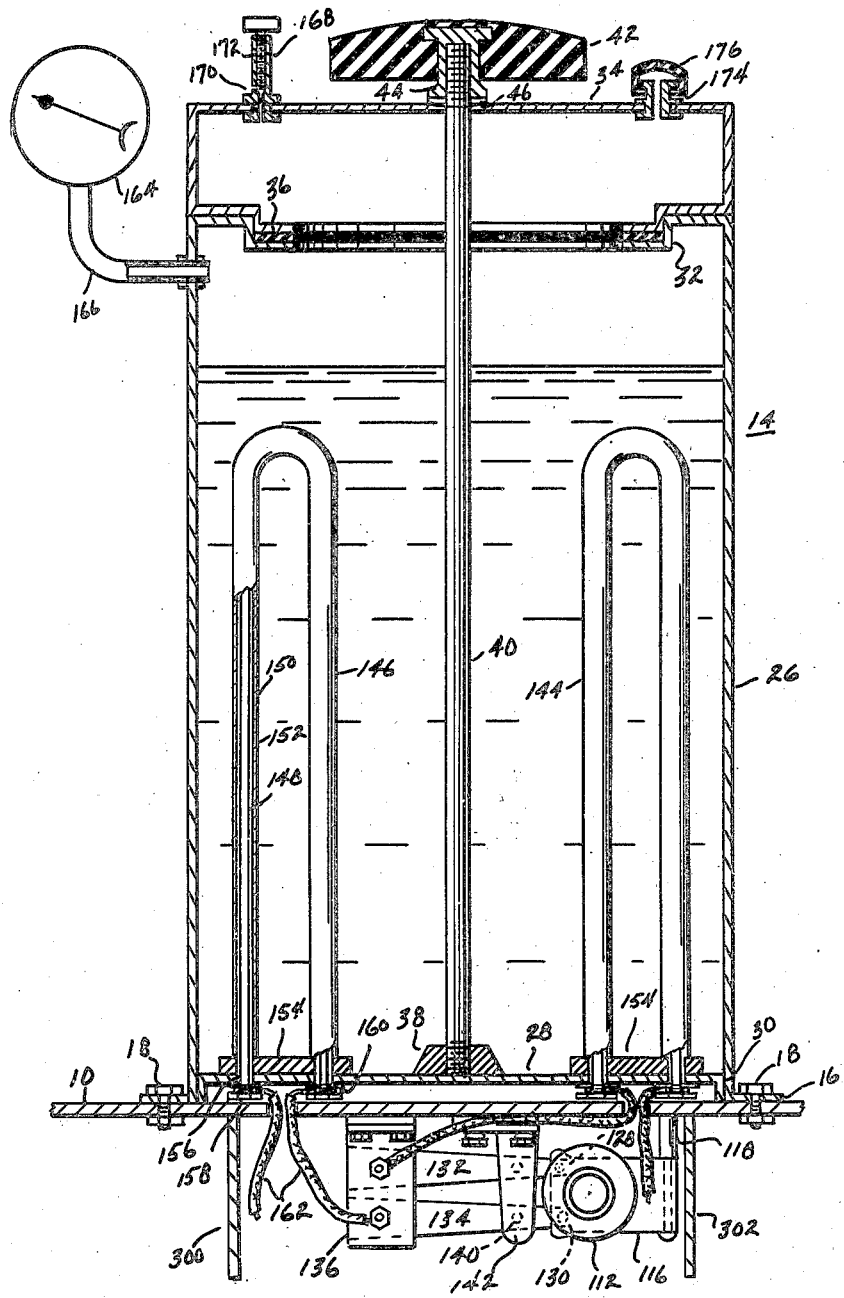
Figure 5 is an enlarged vertical section of the water heater indicated by line 5—5 of Figure 1.

The mechanism preferably employed for controlling the temperature and pressure developed in the water heater will now be described. At the bottom of the water heater is a pipe 106 which extends through the bottom plate 28 of the heater and through the base 10. The pipe 106 is welded or otherwise secured to the bottom plate 28 so as to form a pressure-tight joint. The pipe 106 preferably extends for a short distance above the bottom plate so that settlings will not clog the small openings 108 which connect the pipe 106 with the interior of the water heater 14. For additional insurance against clogging a small screen 110 may be placed over the pipe 106 and its openings 108. The pipe 106 is bent at right angles beneath the base 10 and communicates with a metal bellows 112, which expand and contract in accordance with the pressure developed within the water heater 14. At the other end of the bellows is fixed a thrust rod 114 which bears against a member 116 pivoted to the base 10 by the post 118 as shown in Figures 5 and 14. Another thrust rod 120, shown in Figures 2 and 14, bears on the opposite side of the member 116 and is biased thereagainst by spring 122. The thrust rod 120 slides within a guide 124 which is threaded to fit into an L-shaped bracket 126 which is secured to the under side of the base 10. The threaded guide member 124 is adjustable in the bracket so as to vary the tension of the spring 122.

Figure 20:
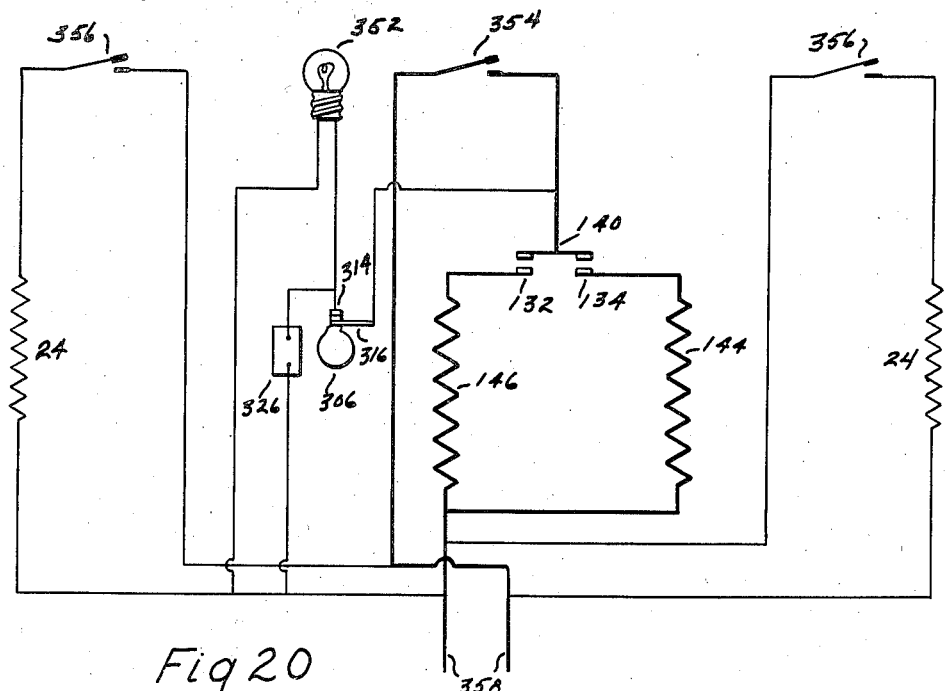
Figure 20 is a diagrammatic layout of the electrical circuits of the apparatus.

The pivoted member 116 engages two adjustable screws 128 and 130 which are insulatedly mounted on two spring conductors 132 and 134, each of which is in circuit with a heating element as shown by the wiring diagram in Figure 20. The spring conductors 132 and 134 are mounted on a bracket 136 which in turn is bolted to the under side of the base 10. Each of the spring conductors 132 and 134 has a silver contact member 138 disposed opposite silver contact members 140 mounted on a bracket 142 which is mounted on the under side of the base member 10 and the contacts 140 are connected to the source of current when a main switch is closed, as shown in Figure 20. The adjustable screws 128 and 130 may be set in such a manner that either contact is made shortly before the other. When the contact 138 of the spring conductor 132 is closed the U-shaped heater member 144 is energized and when contact 138 of the spring conductor 134 is closed the U-shaped heater member 146 is energized. Since the circuits including the two heaters 144 and 146 are parallel circuits it follows that either or both may be energized and deenergized, depending on the setting of the adjustable screws 128 and 130. As will be observed, the contacts are closed by the spring 122 until sufficient pressure is generated in the water heater. The adjustment of screws 128 and 130 predetermines the pressure at which the heater elements will be deenergized, and since pressure is a function of temperature, will also control the temperature which the superheated water attains in the water heater 14. As a practical matter the wear on the silver contact points will be equalized because only one heater will be energized and deenergized during standby periods for keeping the water hot, and the second heater will be energized and deenergized while the coffee maker is in use, the first heater remaining energized in that case.

Each of the heater elements 144 and 146 is preferably composed of a metallic resistor 148 which is sheathed in a copper tube 150 and insulated therefrom by a highly refractory filler 152. The tubes are each secured to a base member 154 to form a water-tight joint therewith and the base members 154 are welded or otherwise securely fastened to the bottom plate 28 of the water heater. The resistor ends, surrounded by insulating material, extend through the base members 154 and the bottom plate 28 of the water heater and are threaded at 156 to receive nuts 158. Washers 160 of electrical insulating material fit about the threaded ends and are interposed between the conducting wires 162 and the bottom plate 28.

A steam pressure gauge 164 is attached to the upper portion of the water heater so that its tube 166 communicates with the space above the normal water level in the water heater.

In the cover of the water heater is placed an adjustable bleed valve 168 for allowing a slow continuous escape of vapor from the space above the normal water level. The reason for employing a bleed valve is to rid the water heater of air which may be dissolved in the cold entering water. Since the coffee maker utilizes the superheated water rather than the vapor formed, the air driven out of the water by heating will accumulate in the space above the water level and commingle with steam. In the absence of a vapor outlet the proportion of air to steam becomes greater and greater. With this steam-air vapor phase over water a greater pressure is attained at the same temperature of the water than where a pure steam phase exists over the water at the same temperature. If the temperature of the water is controlled by a pressure-responsive means, the predetermined pressure is reached where the water has not yet reached its proper temperature unless the air is removed. The bleed valve 168 remedies this situation by preventing the accumulation of air in the space above the water level and thus rendering the pressure control an accurate measure of the temperature as well. The bleed valve 168 consists of a threaded tubular member with an outside opening 170 communicating with the vapor space of the water heater. The needle 172 seats in a reduced portion of the opening as is common practice in needle valves. To effectively bleed the air from the water heater, it is but necessary to adjust the needle so that a barely perceptible amount of vapor escapes.

A safety valve 174 is also placed in the cover 94 of the water heater 14 to insure against an accidental build-up of pressure. The valve 174 is capped by a rubber member 176 which is flanged to fit in an annular groove about the valve. The resilience of the rubber member 176 is such that at a predetermined pressure the member will be blown off the valve, allowing vapor to escape. At operating pressures the rubber member is self-sealing in the annular groove of the valve. Such valve may also be used as a manual vapor vent since when it is depressed the seal is broken and vapor may escape about the sides of the valve. Although this type of safety valve is preferred because of its simplicity, any other safety valve may be employed.

Infusion mechanism

Referring now to Figures 1 and 6, the pipe 94 conducts superheated water from the water heater to the infusion mechanism, including the infusion-receiving compartment or pot 178. As will be explained, the infusion pot 178 is completely separable from the rest of the apparatus, and it is to be noted that the infusion pot is simple and inexpensive in construction. A dish-shaped device 179 may be secured to the base 10 to collect any coffee which may drip from the mechanism. At a position above the infusion pot 178 the pipe 94 is bent downwardly in a vertical leg 180 which at its lower end communicates with a heat-exchanging device or condenser 182 near the bottom of the infusion pot 178.

As shown in Figures 12 and 13, the condenser 182 preferably comprises a cylinder having a diameter which is relatively large in proportion to its height and it is provided with interior baffles 184 for imparting a zigzag motion to the superheated water.

The zigzag action of the superheated water facilitates the transfer of its superheat to the infusion liquid thus preventing or minimizing the flashing of the superheated water into steam upon reaching atmospheric pressure.

After circulating through the condenser 182 the water passes out through an opening which is preferably fitted with a threaded reenforcing collar 186, as shown in Figure 12. A small nozzle 187 is screwed therein and forms the jet of a jet pump as will be described hereinafter. The size of the nozzle 187 is preferably such that the water is maintained under superatmospheric pressure until it issues from the nozzle. In most instances the water will have given up its superheat in the condenser 182 and will issue from the nozzle at a temperature which is not quite sufficient to cause boiling. Whether or not there is a small residue of superheat remaining in the water after it has passed through the condenser is immaterial since most of the steam formed will condense when it strikes the infusion liquid and tend to maintain the infusion liquid at boiling. The ideal condition is attained when the amount of incoming superheat exactly balances the heat losses in the apparatus, the net effect being to maintain the infusion liquid exactly at its boiling temperature without actually boiling the infusion liquid. The maximum of extraction is thus assured without causing the infusion liquid to acquire the usual bitter taste which results from boiling.

The expression "superheated water" where it appears in the present specification and claims designates water in the liquid state at a temperature above boiling, and under superatmospheric pressure sufficient to prevent substantial conversion of the water to steam and adapted to cause the water to be delivered as a positive liquid stream to the coffee for infusion. As previously pointed out the degree of superheating will be such that the water will be delivered to the coffee for infusion at or about boiling temperature (but preferably without actual boiling) instead of at a temperature substantially below boiling, for example 150° or 160°, as is frequently the case with various prior forms of coffee infusing apparatus. The drop in temperature of the water from its initial superheated condition in the water heater to its point of delivery to the coffee will determine the degree of superheating which is required in order that the water may be delivered in the condition indicated. The superheat of the water may not only compensate for heat losses in the water during transit prior to infusion but supply heat to the water which has already been converted to infusion liquid to maintain the liquid during the entire infusion process at a temperature suitable for recirculation through the coffee and dispense with the necessity for this purpose of heating mechanism in conjunction with the infusion-receiving chamber. Under these circumstances the temperature difference between the superheated water in the heating chamber and the infusion liquid in the infusion-receiving chamber may be 36°, more or less, due to heat losses, so that if the infusion liquid is to be maintained near boiling temperature, 204° for example, it will be apparent that the water must be initially superheated in the heating chamber to a temperature substantially above boiling. Unless the incoming water at its superboiling temperature before delivery is under appropriate superatmospheric pressure it is likely to be converted to steam. This would be extremely undesirable, since the superheated water supplied from the heating chamber constitutes the entire supply for making the infusion, and would not if in the state of steam be in condition for delivery to the coffee for infusion unless water for infusion is supplied from an independent source which last is not true with the present invention.

For the reasons indicated it will be understood that steam and mere hot or boiling water are not the equivalent of "superheated water" in carrying out the objects of the invention.

The recirculating tube 188 leading upwardly from the condenser has an enlarged lower end 189 which is threaded to fit the outside diameter of the reenforcing collar 186. The enlarged end 189 also is provided with several apertures 190 drilled therein for allowing infusion liquid to enter at a point below the outlet of the nozzle 187. The device thus constitutes a jet pump and the force of the hot water issuing from the nozzle 187 is sufficient to carry along with it a portion of the infusion liquid for recirculation. An annular fill 191 may be provided in the tube 188 just above the nozzle 187 to create a Venturi effect.

The tube 188 extends vertically upward from the condenser and passes through the supporting arm 192 as shown in Figure 6. A sleeve member 194 threaded at either end fits in the opening drilled through the arm 192 and is secured to the tube 194 as by sweating. Nuts 196 hold the tube 188 in rigid relationship with the supporting post 22.

The lower nut 196 also retains a circular shield 198 in position as shown in Figures 6 and 7. The shield 198 comprises a circular disk which is bent back on itself at 200 for a distance and then is formed into a vertically depending cylindrical portion 202 which acts as a guide for the mouth of the infusion pot 178 when it is raised into position. Buttons 204 may be placed about the cylindrical portion 202 to prevent contact between the metallic cylinder and the glass infusion pot 178, and to maintain more rigidly the infusion pot in position during an infusion process. As shown in Figure 7, two openings are provided in the top of the shield 198 and are fitted with flared guide members 206. The openings are for allowing infusion liquid to drain back into the infusion pot after having percolated through the coffee grounds.

The tube 188 extends above the arm 192 for a sufficient distance to act as a supporting post for the coffee container indicated generally at 208. The outer walls of the coffee container are circular and form a cup-shaped receptacle 210. In the center of the receptacle is secured an upright tubular sleeve 212, the central opening of which extends through the bottom of the receptacle. When placed in position the sleeve fits about the extended end of tube 188 to support the coffee container. Two depending tubes 214 diametrically opposed lead from the bottom of the receptacle 210 for the purpose of conducting infusion liquid from the container. These tubes 214 are disposed so as to enter the flaring guide members 206.

A coffee basket for retaining coffee grounds during the infusion process consists of cylindrical walls 216, a central sleeve portion 218, and a metal screen bottom 220. The cylindrical portion 216 fits closely within the wall of the receptacle 210 and the central sleeve portion fits closely over the tubular sleeve 112 in the center of the receptacle 210. The metallic screen bottom 220 is soldered to the central sleeve portion 218 at a short distance from the lower end of the sleeve so that a clearance space exists between the screen 220 and the bottom of the receptacle 210.

The coffee container 208 is equipped with a circular cover 222 which has a central aperture to receive a threaded reduced portion of the spreader member 224. Openings 226 are drilled in the spreader member 224 communicating with a passageway leading from the recirculating tube 190. A flared guide collar 228 is screwed into the spreader member 224 so as to make an effective joint between the tube 190 and the spreader member 224 when the cover 222 is placed in position. A knob 230 made of non-conducting material is screwed upon the threaded portion of the spreader member 224 so as to secure rigidly both the knob and the spreader member to the cover 222. A distributor plate 232 is held rigidly to the spreader member by the guide collar 228 which has a reduced shoulder portion 234 fitting into a central hole drilled in the distributor plate. The distributor plate 232 has an upturned rim 236 which fits snugly against the inner periphery of the receptacle 210 and has numerous small holes 240 disposed in such a manner that the recirculated infusion liquid will drip evenly over the coffee grounds placed on the screen 220 to secure maximum extraction. A handle 238 of non-conducting material may be secured to the coffee container 208 in the usual manner.

*Supporting mechanism for infusion pot*

Referring now to Figures 1 and 7, the mechanism for holding the infusion pot 178 in operative position is shown. Arms 242 are rigidly secured to pivot rods 244 which are journaled at opposite ends in the brackets 246 and bracket 248 as shown in Figures 1 and 8. Knobs 250 are secured to the respective arms 242 for manually lifting arms 242 or lowering them. Extending downwardly from the arms 242 are inwardly turned L-shaped members 252 with lugs 254 at their ends as shown in Figure 7. The neck of the infusion pot 178 is fitted with a metal band 256 which is bent at its upper edge into a U-shaped flange 258 as shown in Figures 6 and 7. The ends of the band are bent outwardly into brackets 260 which are bolted to a handle 262 for the infusion pot, as shown in part in Figure 6.

When the pot 178 is in position the lugs 254 of the L-shaped members 252 are caught in the U-shaped portion 258 of the band 256 so that the entire infusion pot 178 is supported by the arms 242 as shown by the full line view in Figure 7. It may be seen that whenever it is desired to remove the infusion pot 178 from the support or to replace the pot on the support it is necessary to raise the infusion pot manually to the upper dotted line position shown in Figure 7 before the arms 242 can be moved to or from their dotted line position. It is thus impossible for the arms 242 to be raised while the infusion pot is in position so as to allow the infusion pot to drop from its support by accident.

The arms 242 and associated mechanism are counterparts and in addition, operate simultaneously so that if one of the knobs 250 is lowered or raised, the other will move accordingly. In addition to securing and supporting the infusion pot, the arms 242 also initiate an infusion process when they are lowered to the full line position shown in Figure 7, as will be described below.

*Means for controlling operation of infusion mechanism*

Referring to Figures 1 and 8, the pivot rods 244 have another set of arms 264 integrally or rigidly attached thereto. Pivoted at 265 to each of these arms 264 is a bent arm 266, the two bent arms terminating at another pivot point 268 which is fixed to the end of a vertical thrust rod 270, the latter being shown in Figures 6, 8, 18 and 19. A tension spring 272 connecting the bent arms 266 biases them together. The bracket 248 which supports the pivot rods 244 is secured to the post 22 by a bolt 274, and a rectangular offset on the bracket 248 fits into a similar countersunk portion in the post 22 in order that the bracket 248 will not turn about the bolt 274.

When the pivot rods 244 are turned by raising knobs 250, the pivoted ends 265 of the arms 264 are lowered, thus lowering and slightly separating the bent arms 266. In consequence of this movement, the thrust rod 270 is also given a downward movement.

Figure 19:
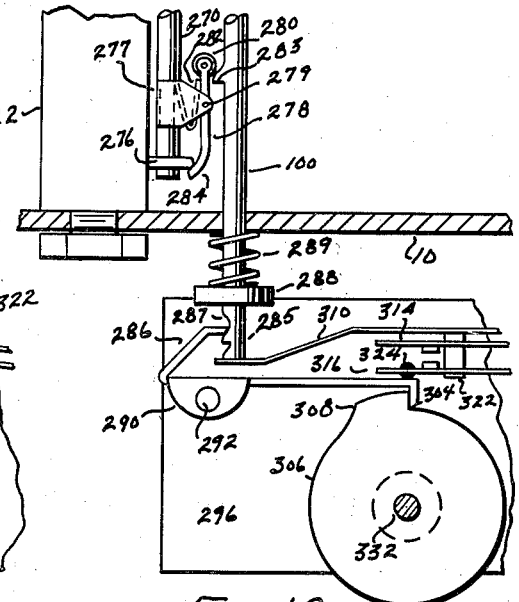
Figure 19 is similar to Figure 15 but shows the normal inoperative position of the timer parts.

As shown in Figures 18 and 19, the lower end of the rod 270 slides vertically in a guide member 276 attached to the supporting post 22. Attached to the rod 270 at a point above the bearing member is a bracket 277 which is adapted to hold a latch arm 278 for pivotal movement as at 279. A roller 280 is secured to the upper end of the arm 278 and a small leaf spring 282 biases the upper end of the arm 278 outwardly so that the roller 280 normally engages the lower horizontal surface of a lug 283 which is fixed to the valve rod 100, as shown in Figure 18.

When the handles 250 are lowered, the upward movement of rod 270 and roller 280 raises the rod 100. Before the upward movement has ended, however, the roller will move out from under the lug 283 permitting the valve rod 100 to fall or to be held in upper position by detent 286. The withdrawal of the roller 280 results from the engagement of the bent end 284 of the arm 278 against the edge of the guide member 276.

Near the end of the valve rod 100 is a notch 285 for engaging the detent latch 286, as shown in Figure 15. Immediately above this notch is a recessed portion 287 into which the detent member 286 can extend when the thrust rod 270 is at the lower of its two positions, as shown in Figure 19. A collar 288 is fixed to the thrust rod 270 and a compression spring 289 is positioned between the collar and the under side of the base 10, thus tending to lower the rod 100 and to urge the needle valve 92 to closed position. When the handles 250 are lowered, valve rod 100 is raised and needle valve 92 is opened and superheated water is allowed to flow into the infusion device until the detent 286 is withdrawn from the notch 285.

The detent 286 for latching the rod 100 in its upper position has downwardly bent ears 290, as shown in Figures 15 and 16, which are mounted on the reduced portion 292 of the post 294. The post 294 is rigidly bolted to the panel 296 which in turn is bolted by means of posts 298 to the partition 300. Another partition 302 (Figure 5) is symmetrically positioned with respect to the partition 300 and they extend for the width of the under side of the base 10 so as to furnish reenforcement for the base.

The detent 286 has a lateral extension on the opposite side of its pivot terminating in a downwardly extending dog 304 as shown in Figures 15, 18 and 19. A wheel 306 with a cam portion 308 engages the dog 304 so as to move the detent 286 to and from an engaging position with respect to the notches 285 and 287. Thus when the dog 304 of the detent 286 rides upon the cam portion 308 of the wheel 306 the detent 286 will be withdrawn and the valve rod 100 will move to its lower position. When, however, the lug 304 rides on the circular portion of the wheel 306, the detent 286 is in its latch position and if the rod 100 is now raised the detent 286 will enter the notch 285 and the rod 100 will be held in its uppermost position.

The lower end of rod 100 engages a leaf spring 310 which is secured to a bracket 312 attached to the panel 296 as shown in Figures 15 and 16. Also secured to the bracket 312 are two spring contact members 314 and 316 which are normally biased apart as in Figure 19. The contact members 314 and 316 are electrically insulated from each other and from the leaf spring 310 by means of non-conducting washers 318 which also space the spring members at their point of attachment by means of bolt 320 to the bracket 312. The leaf spring 310 has an L-shaped member 322 formed of insulating material which extends downwardly and hooks underneath the spring contact 316. Thus, although the spring contact members 314 and 316 are normally biased apart, the stronger normal upward bias of the leaf spring 310 will close the contacts 314 and 316 as shown in Figure 15. But when the rod 100 is in its lower position as shown in Figure 19, the end of the rod pushes the leaf spring 310 to a lower position in which the member 322 does not engage the lower spring contact 316. The lower spring contact 316 also bears a non-conducting button 324. The button 324 is adapted to engage the top of the dog 304 so that when the cam portion 308 of the wheel 306 holds the dog 304 in a raised position, the contacts 314 and 316 will be held closed without resorting to the member 322 of the leaf spring 310. This condition obtains when the parts are in the position shown in Figure 18.

The cam wheel 306 is rotated in a counterclockwise direction by a self-starting electric timing motor 326 mounted on the partition 300 as shown in Figures 14 and 16. The drive shaft of the timing motor 326 extends through the partition and terminates in a gear wheel 328 which is in mesh with the longer gear wheel 330. The gear 330 is mounted on the shaft 332 which is journaled in the panel 296 and extends through the side of the base 10 to terminate in a control knob 334 as shown in Figures 1 and 17. The gear 330 is rotatable with respect to the shaft 332 but a one-way driving connection is established through a pawl 336 and a ratchet 338, the pawl being pivoted to the gear 330 and the ratchet being fixed to the end of the shaft 332 as shown in Figure 16. A flange member 340 attached to the shaft 332 prevents the gear 330 from moving laterally on the shaft 332. Integral with the cam wheel 306 is a hub 341 which terminates in a bearing surface 342 for engaging the panel 296. The cam wheel 306 and its hub 341 are keyed to the shaft 332 at 344. A washer 346 on the opposite side of the panel is held against the panel by the key 348 so that the shaft 332 cannot move laterally with respect to the panel 296.

The control knob 334 (Figure 17) fixed to the end of the shaft 332 has a pointer 348 integral therewith for indicating the fraction of the full infusion time which has elapsed at any instant. When the pointer indicates zero the cam wheel is in the position shown in Figures 15 and 19. If it be desired to interrupt the infusion process or to begin a new one before the previous one has run its course, the control knob 334 may be used to advantage, as will be more fully discussed under the operation of the device.

A flasher eye 350 shown in Figure 1 is illuminated by an electric bulb 352 as indicated in Figure 20. The bulb is placed in a parallel circuit with the timing motor 326 and is energized only when the timing motor is running. The main switch for the water heating elements is shown at 354 and the auxiliary switches for the standby heaters 24 are indicated at 356. The circuit terminals are designated 358.

*Operation*

In the operation of the device, the supply pipe 56 is connected to an outside source of water under pressure, such as city water, and the valve 58 is opened to allow water to enter the water heater 14. When water has reached the level shown in Figure 2, the float 60 will be raised sufficiently to force the needle 68 forward to close off the small opening 62 as shown in detail in Figure 3. Whenever the lever is lowered below this normal level, pressure on the needle 68 is relaxed and water forces its way into the heater 14 through the stub pipe 66.

To heat the water the main switch 354 is closed. When the heater is cold, both the contacts 132 and 134 are closed because the bellows 112 of Figure 2 is in a contracted position. Now, however, as the water heats and steam pressure is developed, a predetermined pressure will break one of the two contacts 132 or 134. Another predetermined pressure slightly greater than the first will break the second contact and if no superheated water is withdrawn from the heater the second contact alone will open and close in response to the pressure charges in the heater as the heater idles, it being necessary only to maintain the proper heat and pressure in this case without heating fresh water. When superheated water is being withdrawn for the infusion process, the second contact remains closed and the opening and closing action occurs at the first contact. In practice the contacts thus wear evenly and it is not necessary to adjust the contacts as frequently as if one contact were subject to greater wear.

A satisfactory working pressure for the water heater has been found to be eight pounds per square inch and, if this pressure is chosen, the first contact may be set to open slightly below eight pounds pressure and the second contact may be set to open slightly above eight pounds pressure. At eight pounds per square inch pressure, the superheated water will maintain a temperature of about 235° Fahrenheit. This temperature will vary, of course, within limits of a few degrees due to atmospheric changes in pressure, but the temperature of the superheated water is not critical. The object of using superheated water is to supply water which will remain at or near the boiling point during the infusion process in spite of the inevitable radiation and conduction of heat from the infusion device.

When it is desired to make coffee infusions, coffee grounds in the proper proportions for one batch are placed in the coffee container 210 and the cover 222 is fitted in place. The empty infusion pot 178 is lifted manually into the position shown in Figure 6 and while being held in an upper position as indicated by the dotted line view in Figure 7, the handles 250 are snapped down into the full line position. The infusion pot locks itself on the supports 252 as previously described.

At the instant the handles 250 are lowered to their holding position the rods 244 turn and so also do the connecting levers 264 which are secured respectively to the rods 244. The rod 270 is raised by the rotary motion of the levers 264 through the links 266 and carries with it the valve rod 100 against the pressure of spring 289. The relationship of the rods 270 and 100 is shown in Figures 18 and 19. As the rod 270 reaches its upper position the roller detent 280 snaps from under the lug 283 because the arm 278 is biased in a counterclockwise direction by the cam action of the end 284 of the arm 278 on the side of the bearing 276. The rod 100 thus released has a tendency to return to its lower position but cannot since the detent 286 now engages the notch 285 at the lower end of the rod 100.

Since the valve rod 100 is now in upper position the needle valve 92 of Figures 2 and 4 will be open and will allow superheated water to flow from the water heater 14 through the pipe 94 and the vertical tubular position 180 to the condenser 182 as shown in Figure 6. The water will make its way through the tortuous path formed by the vanes 184 within the condenser and will escape through the nozzle 187, at first merely flowing back through the openings 190 into the infusion pot 178 but later, when the liquid level covers the openings, the water issuing from the nozzle will impel the liquid of the infusion pot up the recirculating tube 188. When the liquid strikes the member 224 it is caused to divide and to spray out from the openings 226 over the spreader plate 232. Openings 240 in the spreader plate are so arranged and spaced as to allow the recirculated liquid plus the incoming water to drop evenly over the screen 220 on which coffee grounds are placed. After passing through the screen 220 the infusion liquid collects in the bottom of the container 210 and flows out of the two short tubes 214 back into the fusion pot (Figure 7). It will be noted that it is not necessary to add outside heat to the infusion pot during the infusion process. The infusion liquid remains at or near boiling by virtue of the latent heat in the superheated water which takes care of external heat losses.

When the infusion process is completed and the valve 92 is shut off, the infusion pot may be removed by manually lifting the pot with one hand and raising a handle 250 with the other. The infusion pot is then lowered and the infusion liquid poured therefrom. It will be noted that it is impossible to raise the handles 250 without first raising the infusion pot 178. Thus it is impossible for an operator to cause the infusion pot to drop from its support by accident or inadvertence without first having a firm grasp of the handle 262 of the infusion pot 178.

The operation of the timing mechanism will now be described. At the beginning of the operation and with the infusion pot in place, the device is in the condition shown in Figure 15. The detent 286 holds the valve rod 100 in an upper position so that the valve 92 is open. The spring 310 which bears against the bottom of the rod 100 is also in an upper position. The hook member 322 on the leaf spring 310 holds the contact 316 against the contact 314 so that the circuit to the electric clock is closed as shown schematically in the diagram of Figure 20. Parallel to the clock circuit and also operated by the contacts 314 and 316 is the signal lamp 352, and whenever the clock motor 326 is energized the signal lamp 352 will so indicate.

The electric clock and the cam wheel 306 continue to turn until the cam reaches the initial starting position of Figure 19. However, when the dog 304 rides up to the high portion 308 of the cam 306 the detent 286 releases the valve rod 100 so that it assumes its lower position as in Figure 18, to close the needle valve 92. Now the hook member 322 of the leaf spring 310 no longer holds the contact 316 against the contact 314. If there were no other provision for keeping the contacts 314 and 316 closed the motor 326 would be deenergized before the cam 306 reached its original starting position. In order to keep the motor and signal light energized an insulated button 324 is secured to the lower contact member 316 and engages the top of dog 304 to maintain the contacts closed whenever the cam holds the dog in an upper position. The timing motor continues to run and the signal light 352 remains energized until the dog 304 falls over the edge of the cam 306, at which time the timing mechanism appears as in Figure 19.

It will be observed that the infusion pot might be removed from its support at any time after the valve 92 has shut off the flow of superheated water to the infusion pot. It has been found practical, however, to allow the infusion liquid to drain from the coffee chamber for a few seconds before removing the infusion pot. The cam 308 may thus be constructed to cause the motor and signal light to remain energized for the proper length of time for such drainage. When the light goes off the operator may remove the infusion pot. With an infusion pot of six-cup capacity, it has been found advisable to have a rate of flow of superheated water such that the process will be complete in four minutes with an additional fifteen seconds drainage period.

The knob 334 is mounted on the shaft 332 at the side of the apparatus as shown in Figures 1 and 17. The knob turns with the cam wheel and is both an indicator for the instantaneous fraction of time which has elapsed in any one run and is a manual adjustment means for shortening the length of time for a run or for bringing the timing mechanism back to initial starting position without having to wait for the timing clock to rotate the cam wheel 306.

Independent switches 356 control the energization of two standby heaters 24 as shown in Figures 1 and 20. An infusion pot and its contents may be placed on a standby heater to keep the infusion liquid hot for immediate use.

Referring now to Figures 9, 10 and 11, an additional safety device may be employed to prevent the starting of a run when the infusion pot is not placed in position. A detent 360 is pivoted to a bracket 362 which in turn is fastened to the underside of the member 198. A light spring 364 biases the detent 360 in a counterclockwise direction. When the infusion pot is not in position the detent will maintain the supporting arms 252 in their upper position so that they cannot be lowered to start the apparatus in operation. When the infusion pot is held in its upper position the detent 360 is raised by the edge of the infusion pot and the supporting arms 252 may then be lowered as in Figure 10. The infusion pot is thereafter allowed to drop down into its lower self-latching position as shown in Figure 9.

*Modified apparatus especially intended for domestic use*

The invention may be incorporated in a domestic model as well as in a commercial model. The modification shown in Figures 21 and 27 illustrates one application of the invention to domestic use.

The infusion pot in this case is indicated at 366 of Figure 21 and may be constructed of metal, heat-resistant glass, or other suitable material. A handle 368 is attached to a band 370 which encircles the infusion pot near its upper edge and the infusion pot forms a support upon which the remainder of the apparatus rests, and from which it is readily separable. The superheated water chamber 372 has a handle 374 attached thereto for convenience in removing the infusion apparatus from the infusion pot.

A tube 376 is centrally disposed with respect to the infusion pot and the superheated water chamber for conducting superheated water from the chamber 372 to the condenser 378. Surrounding the upper portion of the tube 376 is an outer concentric tube 380 which extends through the bottom of the chamber 372 and has a flanged portion 382 which is soldered or otherwise secured to the bottom of chamber 372 to form a water-tight joint. The tube 380 preferably terminates shortly below the bottom of the chamber 372 and is threaded at its lower end.

Near the bottom of the chamber 372, tube 380 is equipped with openings 384 for the introduction of superheated water from the chamebr 372. At the upper end of the tube 380 the tube is closed except for a small vent 385 to prevent water from being forced into the infusion pot 366 before it becomes hot. A reduced threaded portion 386 extends upwardly from the tube 380 and a flared collar 388 is adapted to fit over and screw onto the threaded portion. The flared collar is attached to the cover 390 of the chamber 372 by the bolt 400 which also secures the cover knob 402 in place.

The cover 390 consists of two disk-like members between which a rubber gasket ring 404 is disposed for engagement with the rim of the chamber 372. The upper disk portion of the cover 390 is bent downwardly at its outer edge to form a short skirt which overlies the rubber gasket and the rim of the chamber 372. In the cover 390 of the superheated water chamber is a spring safety valve 406 of usual construction which may be set to release at about eight pounds per square inch pressure.

The tube 376 extends to within a short distance of the top of tube 380 so as to maintain a communication therebetween. At its lower end the tube 380 is constricted below the openings 384 and the tube 376 is secured therein in a water-tight manner. A nut 408 is threaded on the lower end of tube 380 and rigidly secures together the chamber 372, the heating element casing 410, and the heating element assembly with its cover plate 412.

The lower end of the tube 376 extends into the condenser 378 and is removably wedged into the circular plate 414 as shown in Figures 23 and 24. The plate 414 is disposed laterally in the condenser so that the superheated water entering the condenser 378 through the tube 376 enters below the plate. The water is forced outwardly to the openings 416 and thence back to the upper central part of the condenser 378. A threaded nozzle 418 is concentrically disposed with respect to the tube 376 and the condenser 378 in such a manner as to form a narrow annular opening 420 for directing the incoming water upwardly in recirculating tube 422.

The recirculating tube 422 is threaded to an enlarged lower end 424 which is screwed upon part of the threaded portion of the nozzle 418. Also in this enlarged lower end 424 are inlet openings 426 which allow infusion liquid to enter below the mouth 429 of the nozzle 418 and to be impelled upwardly through the restricted passageway 427 by the force of the water issuing from the nozzle 418.

At the upper end of the recirculating tube 422 is another enlarged portion 428 about which a hood-shaped spreader member 430 extends. The upper end 428 of the recirculating tube 422 is internally threaded and screws upon the lower threaded end of the tube 380. A guard plate 432 is held in position between the upper end of the recirculating tube 422 and the nut 408. Openings 434 in the enlarged upper end 428 of the tube 422 communicate with the space beneath the spreader member 430.

Mounted beneath the spreader member 430 and on the recirculating tube 422 is the coffee basket 436 which is cup-shaped and equipped with a central sleeve 438 which fits about the recirculating tube 422. The bottom 440 of the basket 436 is perforated to allow the infusion liquid to drain therefrom, or the bottom may consist of a screen or other perforated means for accomplishing the same purpose.

A cover 442 fits over the top of the coffee basket 436 and is also perforated in order to distribute the liquid evenly over the coffee grounds. A short tubular member 444 at the center of the cover 442 fits about the sleeve 438. At the under side of the coffee basket 436 is a collar 446 as shown in detail in Figure 27. A detent 448 pivoted at 450 to the collar 446 is biased by spring 452 so that the end 454 of the detent extends through a slot 456 in the collar 446 to engage an annular notched portion 458 cut in the outer surface of the recirculating tube 422 as shown in Figures 27 and 21.

The heating mechanism and control therefor is shown in detail in Figures 22, 25, 26 and 28. The heating element 460 is disposed between two insulating sheets 462. A circular cover plate 412 encloses the heating element 460, together with its insulating sheets 462, between the top of the heater casing 410 and is held in place by the nut 408 placed on the lower threaded portion of the tube 380 as shown in Figure 22.

Mounted on the underside of plate 412 is a bracket 464 which bears the terminals 466 and 468, as shown in Figure 25. The terminals are electrically insulated from the bracket by insulating washers 470 and may be connected with any suitable source of electricity. A conducting piece 490 is fastened at one end to a free end 476 of the heating element 460 as shown in Figures 25 and 28. A screw 478 bearing an insulating washer 480 is fastened to the rectangular piece 482 and passes through a fiber insulating member 484. The fiber insulating member 484 and the rectangular piece 482 are further fastened to the base 412 by means of screw 486. The free end 476 of the heating element extends through the fiber piece 482 which positions it at the center of an opening 488 in rectangular piece 482 and the base 412. The other free end 477 of the heating element 460 is connected with a conducting piece 472 which is fastened to terminal 466 by nut 474.

The conducting piece 490 is insulatedly mounted on the base 412 at 492 and terminates in a contact point 494. Another bracket 496 is mounted on the base 412 by screws 498 and carries a binding post 499 connected by wire 500 to terminal 468. Also attached to the binding post 499 and in electrical contact with the wire conductor 500 is a spring contact 502. The spring contact terminates in a contact point 504 which is adapted to engage contact 494. An adjusting screw 506 is mounted insulatedly on the spring contact 502 so that it is engageable by the free end of a bimetallic strip 508 as shown in Figures 21, 25 and 26. The bimetallic strip 508 is encased in a housing formed by member 510 and the wall of the water chamber 372 and extends through an opening 511 in the heater casing 410. The handle 374, the housing member 510, and the bimetal 508 are all mounted on the bolt 512 which is attached to the superheated water chamber 372, as shown in Figure 21. The bimetal is subject to the heat of the walls of chamber 372 and when heated to a predetermined temperature will bend inwardly, engage the end of the adjusting screw 506 and thereby break the contact 494, 504 to deenergize the heating element 480.

In the operation of the modification shown in Figures 21 to 28, the coffee container 436 is lowered on the tube 422 by releasing the latch 448. If desired, the condenser 378 and the lower end 424 may be unscrewed from the tube 422 thus allowing the coffee container 436 to be completely removed from the tube 422. The distributing cover 442 is then removed and the desired amount of coffee grounds is placed within the coffee container. The cover is replaced and the coffee container moved up the tube 422 to its latched position as in Figure 21. The entire infusion unit is then placed in position on an empty infusion pot 366 and in this position, the condenser portion 378 will be a short distance above the bottom of the infusion pot. The cover 390 of the superheated water chamber 372 is unscrewed from the threaded top of the tube 380 and the desired amount of water placed in the chamber. The terminals of the infusion device are connected to a suitable source of electricity and since the contacts 494, 504 are now closed, the heating element 480 will begin to heat the water in the chamber. Due to expansion of the water and the presence of vapor over the water, a pressure immediately begins to build up within the chamber.

The tendency during this warming up process is to force water through openings 384, up tube 380 and into tube 376 and infusion pot 366. It is desired, however, that only superheated water be delivered to the infusion pot and recirculation device and therefore a small vent 385 is placed near the top of the tube 380. The result is that any preliminary vapor pressure established in the chamber 372 will be relieved by the escape of vapor through the vent 385 and warm water will not be forced over into tube 376. Now, however, when the water actually begins to boil the generation of steam pressure so far exceeds the ability of the vent 385 to allow it to escape, that pressure is built up within the chamber and water is forced up tube 380 and into tube 376. The addition of heat is continued and the water immediately superheats to an equilibrium temperature and pressure (for example approximately 227° F. at about five pounds per square inch), and the superheated water escapes rapidly at this pressure. As the water level diminishes the side walls of the container 372 become hotter and at or before the depletion of the water in the superheated water chamber 372 the bimetal 508 will have responded to the temperature rise sufficiently to break the contact 494, 504. Thereafter, if a user neglects to shut off the supply of electrical current, no damage will be done to the infusion apparatus because the bimetal will deenergize and reenergize the heating element within a definite and safe temperature range.

The superheated water entering tube 376 passes down to the condenser 378 where it is forced back up through the openings 416 in the baffle plate 414 and out of the nozzle opening 420. As soon as the infusion liquid level in the infusion pot 366 covers the openings 426 in the lower end 424 of the tube 422 such infusion liquid will enter the openings and be drawn upwardly through the opening 427. The momentum of the water issuing from the nozzle 418 pumps the infusion liquid to the upper end of tube 422 from which it leaves through openings 434 and is impinged against the spreader member 420. The fresh boiling water together with the recirculated infusion liquid runs through the openings in the cover plate 442 and drops on coffee placed in the coffee container 436 which it extracts and drips back to the infusion pot. The purpose of the condenser is to transfer all or a part of the superheat to the infusion liquid already in the pot so as to maintain the liquid at boiling during the infusion process.

When the water is substantially exhausted from the compartment 372 and the heating element has accordingly been deenergized, the making of the infusion is complete. The infusion may be left in the compartment 366 and the remainder of the apparatus may be lifted up and placed on another infusion-receiving compartment for making a second batch of coffee.

Various modifications of the process and apparatus are contemplated and are within the scope of this invention.

I claim as my invention:

1. An apparatus for making coffee infusions comprising a support, a coffee holder mounted on said support, an infusion pot secured to said support by manually operable latching means, a source of superheated water, a passageway for conducting the superheated water into heat transferring relationship with the infusion liquid in the infusion pot and a valve in said passageway operable to open position by movement of said latching means into position to hold the infusion pot, a timing mechanism, means operable to initiate operation of the timing mechanism upon the opening of the valve and means actuated by the timing mechanism for closing said valve after a predetermined time.

2. An apparatus for making coffee infusions comprising a support, a coffee holder mounted on said support, an infusion pot secured to said support by manually operable latching means, a source of superheated water, a passageway for conducting the superheated water into heat transferring relationship with the infusion liquid in the infusion pot and a valve in said passageway operable to open and closed position respectively by the upward or downward movement of a vertically movable valve rod, links connecting said manually operable latching mechanism to a second vertically movable rod, means adapted to engage and lift the valve rod when the manually operable latching mechanism is moved to secure the infusion pot in place, means adapted to engage the valve rod for holding it in raised position during the infusion process, and a timer mechanism for disengaging said last mentioned means at the end of the infusion process to permit the valve rod to drop to close the valve.

3. An apparatus for making coffee infusions comprising a compartment for receiving infusion liquid, a separate source of superheated water for infusion, means for transferring heat from the superheated water before infusion to the infusion liquid, said means comprising a tube leading from the source of superheated water and a heat exchanger with which said tube is connected, the heat exchanger comprising a compartment having baffles for circulating heated water therein and being disposed within the infusion receiving compartment, and means including a coffee holder connecting with the heat exchanger compartment for infusing the heated water after passage through the heat exchanger compartment and delivering the same as infusion liquid to the infusion liquid receiving compartment.

4. An apparatus for making coffee infusions comprising a compartment for receiving infusion liquid, a separate source of superheated water for infusion, means for transferring heat from the superheated water before infusion to the infusion liquid, said means comprising a cylindrical compartment located in the infusion receiving compartment and having a diameter which is substantially greater than its height, said compartment having diametrically opposed inlet and outlet openings on its upper surface, and baffle plates within said compartment extending nearly from side to side of the compartment between the inlet and outlet openings, means connecting the inlet of the baffled compartment to the source of superheated water, and means including a coffee holder connecting with the outlet of the baffled compartment for infusing the heated water and delivering the same as infusion liquid to the infusion receiving compartment.

5. An apparatus for making coffee infusions comprising a compartment for receiving infusion liquid, a separate source of superheated water, means for transferring heat from the superheated water to the infusion liquid comprising a tube leading from the source of superheated water to a heat exchanger located within the infusion-receiving compartment, and means for circulating the infusion liquid through the coffee comprising a nozzle connected to the outlet of the heat exchanger, the nozzle being located at least partially within a second tube leading to a point above the coffee being infused and an opening adjacent the nozzle through which infusion liquid is drawn by the water issuing from the nozzle.

6. A process of making a batch of coffee from a batch of fresh coffee grounds comprising passing superheated water through a conduit to the top of the coffee grounds, permitting the heated water to pass downwardly through the coffee grounds for infusion and into an infusion-receiving compartment and pumping at least a part of the infusion through said conduit to the top of the coffee grounds with the superheated water for further infusion, said superheated water being the only liquid supplied in the making of each batch of coffee.

7. An apparatus for making coffee infusions comprising a support, a coffee holder mounted on the support, a pot for receiving infusion liquid engageable with the support in a position beneath the coffee holder and removable from the support independently of the coffee holder, a source of superheated water for infusion outside the pot, and passageway means depending from the support for conducting water from said source to the lower portion of the pot and for conducting water from said source to the coffee holder and injector means for injecting infusion liquid from the lower portion of the pot into the passageway means for recirculation to the coffee holder.

8. An apparatus for making coffee infusions according to claim 7 wherein the pot is suspended from the support and including means for detachably securing the pot to the support independently of the coffee holder.

9. An apparatus for making coffee infusions according to claim 7 wherein the support is removably mounted on and supported by the pot.

10. An apparatus for making coffee infusions according to claim 7 wherein the support is removably mounted on top of the pot and the source of superheated water comprises a pressure chamber and heating means therefor mounted on the support.

11. An apparatus for making coffee infusions comprising a supporting member, a coffee holder carried by said member, a source of hot water, a first tube supported by and depending from the supporting member connecting at its upper end with said hot water source, a second tube supported by and depending from the supporting member communicating at its upper end with the coffee holder, and a jet pump interconnecting the lower ends of the first and second tubes for simultaneously delivering through the second tube to the coffee holder water from the first tube and infusion liquid which has passed through the coffee holder.

12. A process of making a coffee infusion comprising preliminarily heating all the water to be infused under pressure to superheated condition, delivering the water entirely under the pressure thus developed in a stream to a body of coffee for infusion and withdrawing and collecting the resulting infusion liquid at a point removed from the superheating point, and heating the collected liquid which has been infused solely by the superheat of the uninfused superheated water by conducting the superheated water in the course of delivery to the coffee in heat exchange relation with the collected infusion liquid.

13. A process of making a coffee infusion comprising preliminarily superheating water to be infused and gradually flowing the water through a body of coffee to form an infusion and until the desired amount of infusion has been obtained, and in the course of delivery to the coffee conducting the superheated water in heat exchange relation with already infused portions of the water to reduce the temperature of the superheated water delivered to the coffee at least to the boiling point and heat already infused portions by absorption of the superheat from the water.

14. A process of making a coffee infusion according to claim 13 wherein the infused liquid is gradually recirculated through the coffee simultaneously with and solely by the delivery of the uninfused water to the coffee.

15. A process of making a coffee infusion comprising preliminarily heating water to superheated condition preparatory to making an infusion from the water, gradually delivering the water under its inherent pressure to a body of coffee and collecting the water as fast as converted to infusion liquid, and employing the superheated water, in the course of delivery to the coffee before infusion, as a source of power to recirculate collected infusion liquid through the coffee for further infusion and also transferring heat from the superheated water to the collected liquid infusion to maintain said liquid at a temperature suitable for further infusion.

16. An apparatus for making coffee infusions comprising a first compartment for receiving infusion liquid, a coffee holder above said first compartment and delivering infusion liquid thereto, a second pressure water heating compartment normally closed to the atmosphere supplying the water for infusion liquid and holding sufficient water for one batch of infusion liquid, means for heating the water in the second compartment to a temperature above its atmospheric boiling point and a passageway leading from the second compartment to a point above the first compartment and thence downwardly into the lower portion of the first compartment for conducting superheated water to heat the infusion liquid, and means connecting with said passageway in the lower portion of the first compartment for circulating the water from said second compartment and the infusion liquid from said first compartment through the coffee holder for delivery to the first compartment.

17. An apparatus for making coffee infusions comprising a first compartment for receiving infusion liquid, a coffee holder above the first compartment and delivering infusion liquid thereto, a second compartment normally closed to the atmosphere supplying the water for the infusion liquid and holding sufficient water for one batch of infusion liquid, means for heating the water in the second compartment to a temperature above its atmospheric boiling point and a passageway leading from the second compartment to a point above the first compartment and thence downwardly into the lower portion of the first compartment for conducting superheated water to heat the infusion liquid, and further means connecting with the passageway in the lower portion of the first compartment and extending upwardly through said compartment to a point above the coffee holder for circulating the water from said passageway and the infusion liquid from the first compartment through the coffee holder and a jet pump connecting with the first passageway for forcing the liquid up through the second passageway under the water pressure transmitted from the second compartment.

MAURICE H. GRAHAM.